(12) United States Patent
Dolios (10) Patent No.: US 9,487,056 B1
(45) Date of Patent: Nov. 8, 2016

(54) MOTOR VEHICLE TIRE TRACTION DEVICE FOR ICE AND SNOW

(71) Applicant: Nicholas Dolios, Jackson Heights, NY (US)

(72) Inventor: Nicholas Dolios, Jackson Heights, NY (US)

(*) Notice: Subject to any disclaimer, the term of this patent is extended or adjusted under 35 U.S.C. 154(b) by 297 days.

(21) Appl. No.: 14/057,550

(22) Filed: Oct. 18, 2013

(51) Int. Cl.
*B60C 27/02* (2006.01)
*B60C 27/04* (2006.01)
*B60C 27/00* (2006.01)

(52) U.S. Cl.
CPC ........... *B60C 27/023* (2013.04); *B60C 27/006* (2013.04); *B60C 27/0269* (2013.04); *B60C 27/045* (2013.01)

(58) Field of Classification Search
CPC ..... B60C 27/006; B60C 27/20; B60C 27/02; B60C 27/023; B60C 27/0261; B60C 27/0269; B60C 27/04; B60C 27/045
See application file for complete search history.

(56) References Cited

U.S. PATENT DOCUMENTS

| | | | | |
|---|---|---|---|---|
| 3,071,173 A | * | 1/1963 | Hoffmann | B60C 27/045 152/216 |
| 3,117,612 A | * | 1/1964 | Minutilla | B60C 27/04 152/216 |
| 3,190,335 A | * | 6/1965 | Isaacman | B60C 27/04 152/216 |
| 3,847,196 A | * | 11/1974 | Gomez | B60C 27/045 152/219 |
| 5,513,684 A | * | 5/1996 | Laub | B60C 27/10 152/216 |
| 6,983,778 B1 | * | 1/2006 | Pitts | B60C 27/045 152/216 |
| 2008/0136247 A1 | * | 6/2008 | Janty | B60B 7/061 301/37.104 |
| 2009/0056848 A1 | * | 3/2009 | Maltezos | B60C 27/045 152/216 |
| 2010/0170603 A1 | * | 7/2010 | Polyakovics | B60C 27/04 152/225 R |
| 2011/0094643 A1 | * | 4/2011 | Reil | B60C 27/04 152/216 |

* cited by examiner

*Primary Examiner* — Kip T Kotter
(74) *Attorney, Agent, or Firm* — Michael I. Kroll; Edwin D. Schindler (57) ABSTRACT

A motor vehicle tire traction device having a traction-blade plate that can be selectively mounted indefinitely to a motor vehicle tire with the plate providing sleeves for a plurality of traction blades where one or more of the blades can be quickly inserted into a traction blade sleeve providing traction to said tire wherethen the traction blade(s) can be stored until needed again.

8 Claims, 13 Drawing Sheets

MOTOR VEHICLE TIRE TRACTION DEVICE FOR ICE AND SNOW

BACKGROUND OF THE INVENTION

Field of the Invention

The present invention relates generally to motor vehicles and, more specifically, to a motor vehicle tire traction device that can be easily enabled and disabled when needed by inserting traction blades into sleeves provided on a traction blade plate that is selectively mounted, either before inclement weather or at the start of the winter season, to a respective motor vehicle wheel hub so that when one or more of the available traction blades are needed to provide vehicle tire traction when stuck on ice, snow and/or soft ground, one or more of the available traction blades are inserted into a corresponding number of traction blade sleeves on one or more traction blade plates mounted on the vehicle's hubs. Once traction is gained the blades can be removed and stored until needed.

Description of the Prior Art

There are other traction devices designed for motor vehicles. While these traction devices may be suitable for the purposes for which they where designed, they would not be as suitable for the purposes of the present invention as heretofore described.

It is thus desirable to provide a tire traction device comprising a motor vehicle hub-mountable traction-blade plate that can be mounted to a motor vehicle wheel hub indefinitely so that when tire traction is lost on soft ground, mud, snow and icy surfaces, traction can be easily and quickly regained by opening one or more of the traction-blade plate sleeves' quick release tensive clip latch, inserting a corresponding number of traction blades into, then closing the one or more traction-blade plate sleeve latches thereby fixedly attaching the one or more traction blades to the one or more motor vehicle hub traction blade plates until selectively released. Once traction is regained, the blade enabled sleeves can be easily opened by lifting a respective quick release latch, removing the blade, closing the sleeve's quick release tensive clip latch and repeating the process until all the desired blades are removed whereupon the traction blades are stored until needed.

It is further desirable to provide a motor vehicle tire traction device having a traction blade with a shank portion and an angularly extending traction portion having a road engaging surface that can be textured or covered by a frictional material.

SUMMARY OF THE PRESENT INVENTION

A primary object of the present invention is to provide a motor vehicle tire traction device having a semi-permanently tire hub mountable traction-blade plate incorporating a plurality of radially oriented sleeves thereon and a plurality of traction blades that are selectively inserted into said sleeves to provide traction to a tire stuck on ice or snow.

Another object of the present invention is to provide a motor vehicle tire traction device comprising a traction-blade plate, traction blades and tensive clip handles.

Another object of the present invention is to provide a motor vehicle traction device wherein said traction-blade plate has a top side and a bottom side with a plurality of through bores whereby said traction-blade plate can be mounted to a motor vehicle tire's wheel hub.

Another object of the present invention is to provide a motor vehicle tire traction device wherein said traction-blade plate back side is contoured to fit a plurality of different wheel hub covers.

Another object of the present invention is to provide a motor vehicle tire traction device wherein said contoured back plate matingly engages the respective contour of a respective wheel hub cover thereby forming an interlocking bond between said traction-blade plate and said wheel hub cover.

Another object of the present invention is to provide a motor vehicle tire traction device wherein said traction-blade plate contour is manufactured from a polymeric or elastomeric material that will not mar said wheel hub cover.

Another object of the present invention is to provide a motor vehicle tire traction device wherein said traction-blade plate top side has a plurality of radially arrayed traction blade sleeves.

Another object of the present invention is to provide a motor vehicle tire traction device wherein the traction blade sleeve is a channel having left and right sides extending the length of said channel.

Another object of the present invention is to provide a motor vehicle traction device wherein the walls of the sleeve channel have opposing side recesses forming seat for anchoring a tensive clip rod portion therein.

Another object of the present invention is to provide a motor vehicle traction device wherein said traction blade comprises a shank portion and a traction portion angularly extending from said shank portion.

Another object of the present invention is to provide a motor vehicle traction device wherein said traction blade traction portion has a tire engaging surface and a road engaging surface.

Another object of the present invention is to provide a motor vehicle tire traction device wherein the road engaging surface of a traction blade can be textured.

Another object of the present invention is to provide a motor vehicle tire traction device wherein the road engaging surface of a traction blade further provides for a frictional material layer.

Additional objects of the present invention will appear as the description proceeds.

The present invention overcomes the shortcomings of the prior art by providing a motor vehicle tire traction device that can be easily enabled and disabled when needed by inserting traction blades into sleeves provided on a traction blade plate that is selectively mounted, either before inclement weather or at the start of the winter season, to a respective motor vehicle wheel hub so that when one or more of the available traction blades are needed to provide vehicle tire traction when stuck on ice, snow and/or soft ground, one or more of the available traction blades are inserted into a corresponding number of traction blade sleeves on one or more traction blade plates mounted on the vehicle's hubs. Once traction is gained the blades can be removed and stored until needed.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Turning now descriptively to the drawings, in which similar reference characters denote similar elements throughout the several views, the figures illustrate the use of the present invention. With regard to the reference numerals used, the following numbering is used throughout the various drawing figures.

10 motor vehicle tire traction device
12 motor vehicle
14 tire
16 wheel hub
18 wheel hub cap
20 wheel hub bolt
22 traction-blade plate
24 traction-blade plate front surface
26 traction-blade plate back surface
28 traction-blade plate pad
30 traction blade sleeve
32 traction blade sleeve wall
34 sleeve stud recess
36 sleeve latch socket
38 tensive clip fastener
40 tensive clip handle
42 tensive clip latch
44 traction blade
46 traction blade shank portion
48 traction blade traction portion
50 traction portion traction surface
52 traction portion tire surface
54 traction surface frictional element
56 traction blade stud
58 traction blade tensive clip handle socket
60 hub bolt fastener and extenders
62 hub bolt aperture
64 plate air valve aperture
66 plate wheel hub aperture

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Figure 1:
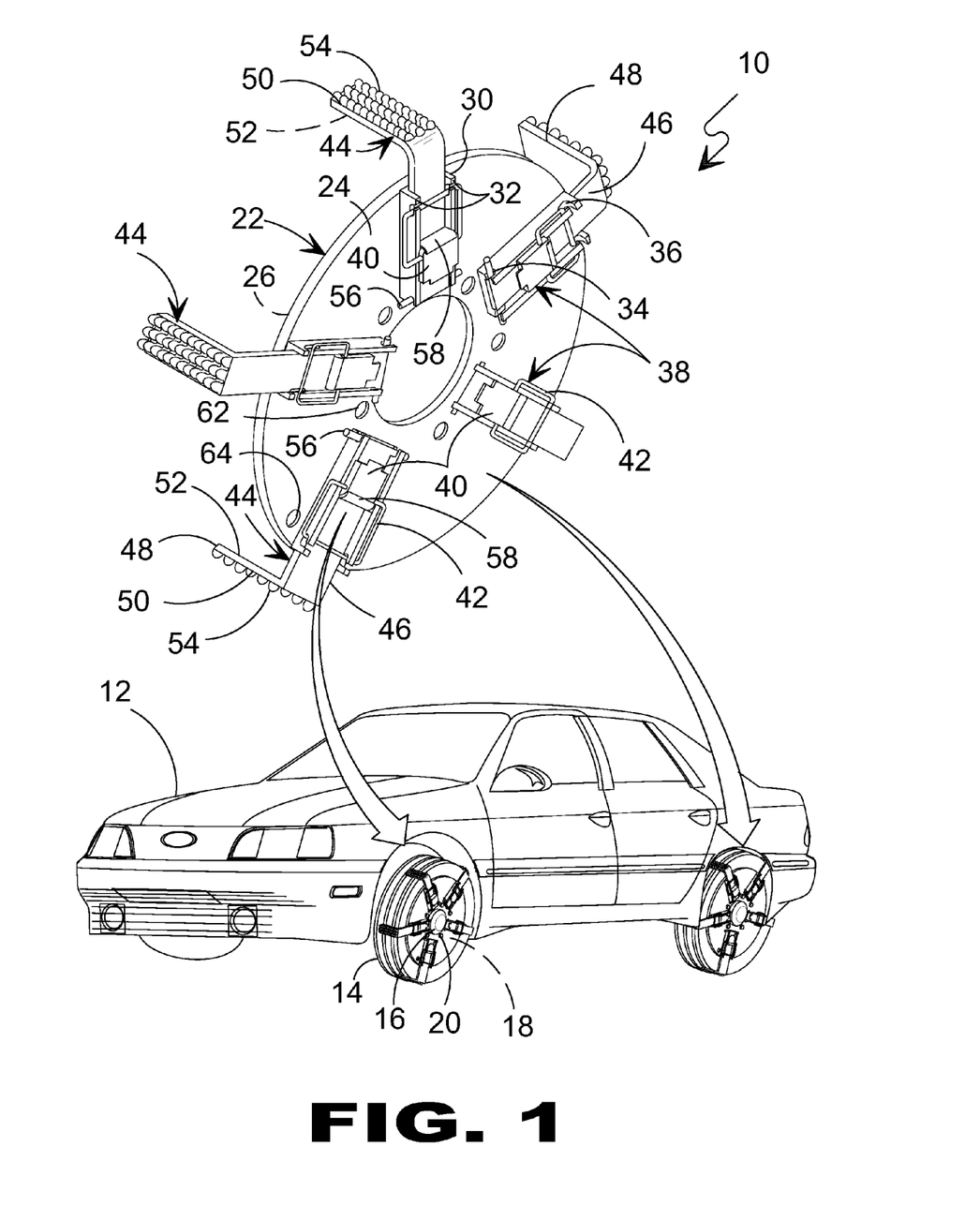
FIG. 1 is an illustrative view of the motor vehicle tire traction device of the present invention.

Referring to FIG. 1, shown is an illustrative view of the motor vehicle tire traction device of the present invention. Snow and ice that can leave vehicles stranded is a big problem for millions of motorists. While there are numerous types of traction belts that can be attached to a car, most are cumbersome, difficult to use once your stuck and not designed to be left on the vehicle once the roads have been cleared. The present invention provides a traction device 10 having two members. The first is a plate 22 having wheel hub aperture and hub bolt apertures 62 so that the plate can be attached to a motor vehicle 12 tire 14 over wheel hub 16 with or without hubcap 18 by fastener to the existing tire lug bolts 20 and since there are no road engaging traction device elements extending from traction plate 22, the plate can be left on the vehicle 12 for an indefinite length of time, such as all winter. The second member of the traction device 10 is a plurality of blades 44 that are selectively mountable and dismountable to the traction plate 22 when needed without the need for additional tools. Traction plate 22 has a front surface 24 and back surface 26 with front surface 24 having a plurality of radially positioned traction blade sleeves 30 incorporating walls 32 that have sleeve stud recesses 32 and sleeve latch socket 36 for securely holding traction blade 44 within sleeve 30 using tensive clip fastener 38. The blades 44 have a shank portion 46 and a traction portion 48 with the shank portion having a pair of opposing side studs 56 that seats within sleeve recesses 34 when traction blade 44 is positioned within sleeve 30 wherethen tensive clip fastener 38 having latch 42 is positioned within sleeve socket 36 with handle 40 then positioned within traction blade socket 58. Handle 40 is then closed by pivoting the handle body into engagement with traction blade 44. The traction portion 48 of traction blade 44 provides a tire surface portion 52 and a road engaging traction surface 50 that may be milled with a rough surface or plated with a frictional element 54. It should be noted, that when needed one or more of the blades can be quickly inserted into a respective traction plate blade sleeve and held there by a respective blade's tensive clip fastener. When no longer needed, the tensive clip handle 40 is pivoted from it seated position within traction blade socket 58, allowing the blade to be removed and stored until needed again. Furthermore, the ordinary person can easily insert and remove blades as needed since the only force required is to pivot the tensive clip handle 40 into and out of traction blade socket 58 including senior citizen.

Figure 2:
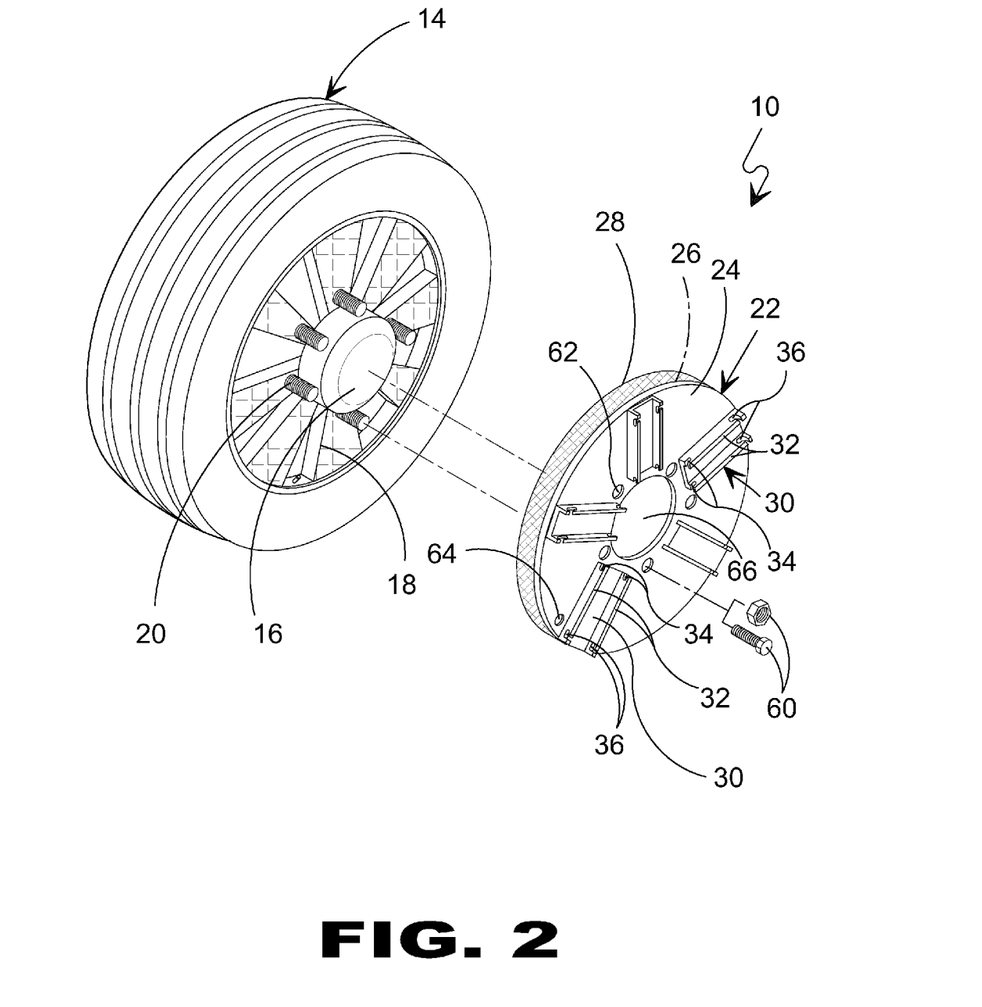
FIG. 2 is a motor vehicle tire mounted to a motor vehicle (not shown) with the traction device exploded from the tire.

Referring to FIG. 2, shown is a motor vehicle tire mounted to a motor vehicle (not shown) with the traction device exploded from the tire. The traction device 10 of the present invention provides for a tire 14 mountable traction-blade plate 22 that can be mounted and dismounted from tire 14 as needed. Traction-blade plate 22 is a substantially planar plate having a back side 26 and front side 24 with hub aperture 66 sized to receive tire hub 16 and hub bolt apertures 62 receiving hub bolts 20 thereby allowing the traction-blade plate 22 to be mounted onto tire 14 using the hub bolt fasteners 60 or extension bolts. The motor vehicle traction device 10 of the present invention optionally provides for a pad 28 fixedly attached to the back surface 26 of traction-blade plate 22 having a contour to fit a respective tire hubcap 18 to prevent any marring or damage to said hubcap by the traction-blade plate 22. The front surface 24 of traction-blade blade 22 provides a plurality of fixedly attached sleeves 30 having walls 32 with cavities 34, 36 for releasably attaching a traction blade and a tensive clip. The present invention further provides said plate 22 with an air valve aperture 64 providing access to the tire air valve while the traction-blade plate 22 is mounted onto tire 14.

Figure 3:
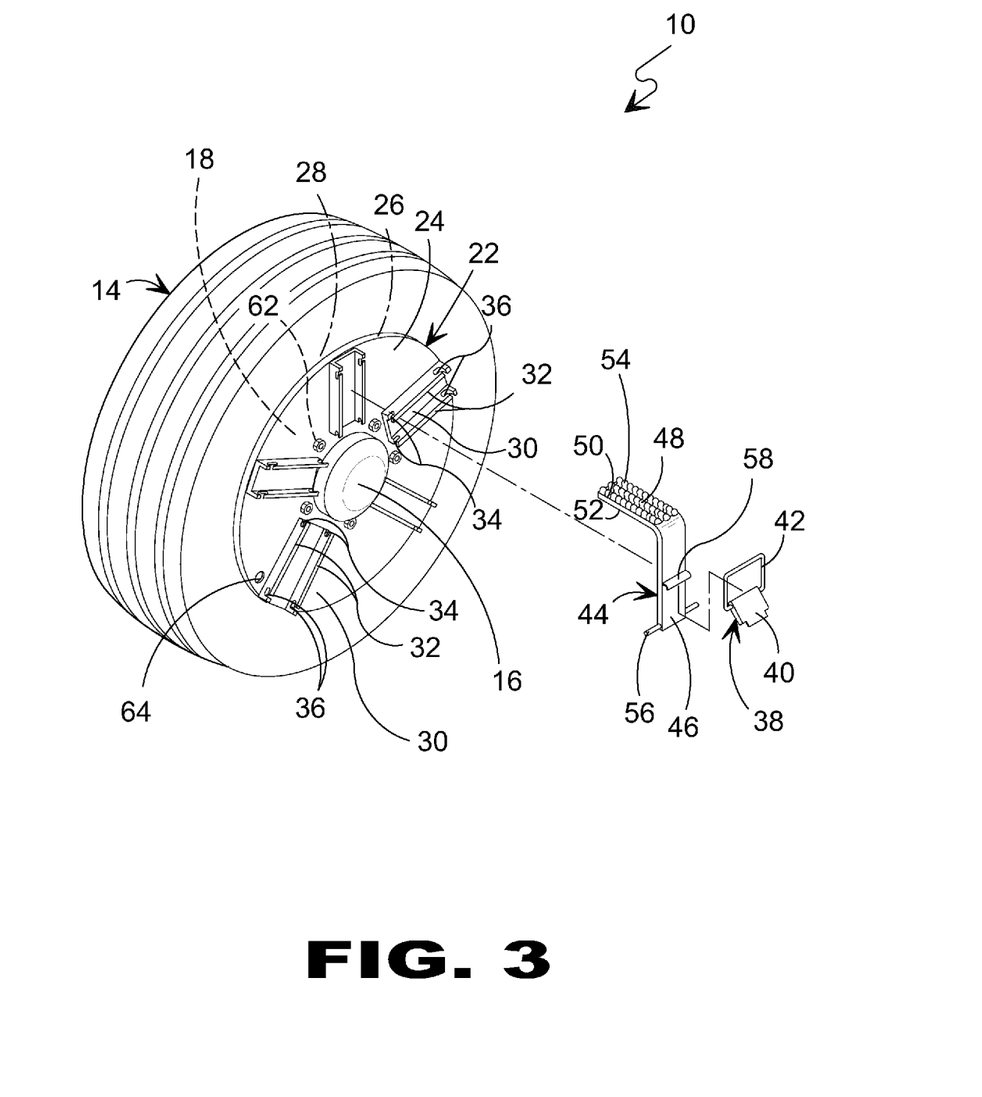
FIG. 3 is traction blade and tensive clip exploded from the traction-blade plate.

Referring to FIG. 3, shown is traction blade and tensive clip exploded from the traction-blade plate. The traction device 10 of the present invention provides a motor vehicle having a tire hub 16 and hub bolts 20 with a tire traction device 10 comprising mountable plate 22 that can be mounted to a tire well before inclement weather or at the start of the winter season allowing user's to quickly mount and dismount traction blades that are designed to provide a tire traction when on ice or stuck in show or mud. Plate 22 provides a plurality of sleeves 30 fixedly mounted to surface 24 of plate 22. The sleeves 30 having walls 32 with cavities 34, 36 forms receptacles for a plurality of traction blades 44. To mount a blade within a sleeve, the traction blade 44 has a pair of outwardly depending studs 56 that are seated within sleeve's 30 stud recess 34 wherethen tensive clip 38 having handle 40 and pivotally attached latch 32 that is seated within the sleeve's latch socket 36. The traction blade 44 has a handle socket 58 so that when latch 32 is placed in socket 36, the tensive clip handle 40 is positioned within the traction blade handle socket 58 with pressure then applied to the front of the handle thereby latching latch 32 pivotally attached to handle 40 comprising hubcap 18 having the present invention is a motor vehicle traction device for use during inclement weather, such as freezing rain, ice and snow the device comprises a wheel mounted frame incorporating a plurality of sleeves and tensive clips that can be mounted to a respective motor vehicle tire at any time, such as the beginning of winter with the traction device providing a plurality of traction blades that are quickly and easily fastened within the tensive clip sleeves when needed and easily removed from the tensive clip sleeves when no longer needed. It is not necessary to mount all of the blades within the tensive clip sleeves as one or more mounted blade may be all that's necessary for a vehicle operator to gain traction on ice and snow where then the one or more blades can be removed and stored until needed.

Figure 4:
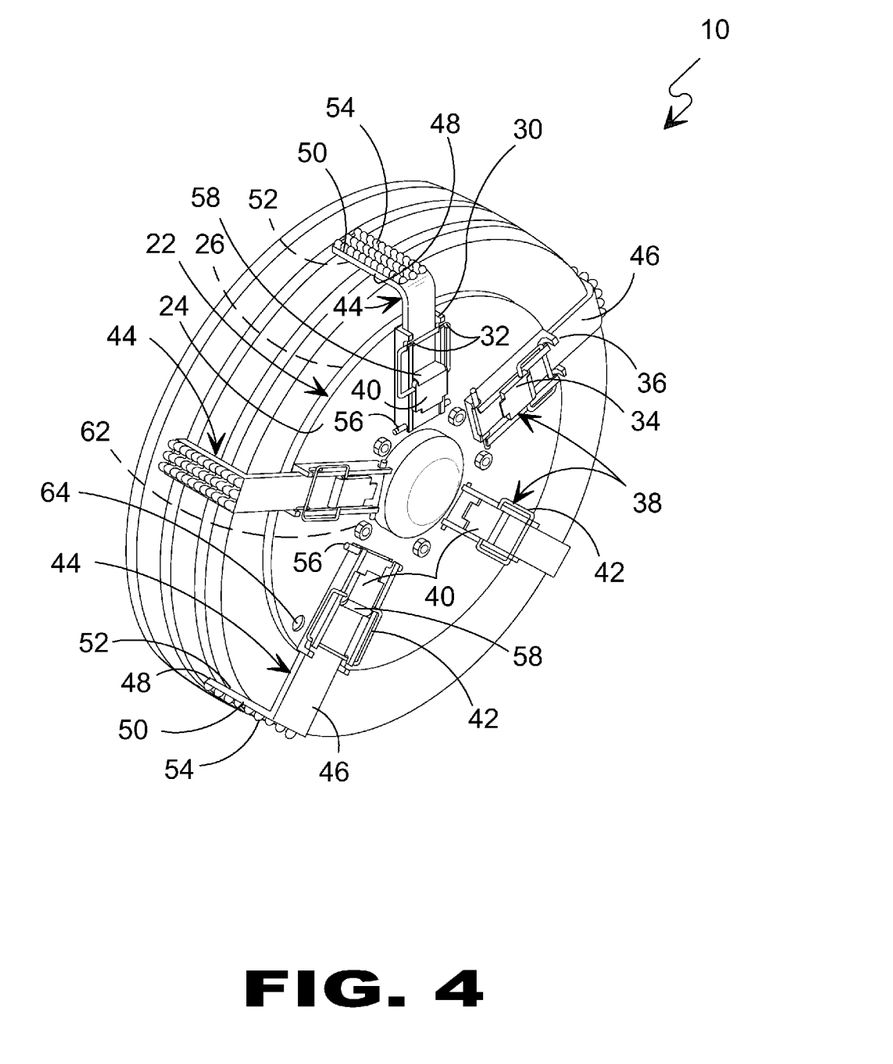
FIG. 4 is an assembled view of a motor vehicle tire having the traction device fastened thereto.

Referring to FIG. 4, shown is an assembled view of a motor vehicle tire having the traction device fastened thereto. The traction device 10 of the present invention provides traction blade 44 means for providing traction to a tire 14 stuck in mud, snow and ice. While a plurality of traction blades 44 are shown releasably fastened within sleeves 30, the present invention provides that a single blade may be enough to provide traction for tire 14. The present invention further provides a blade receptacle comprising a plate 22 having a plurality of radially arrayed sleeves 30 with the plate 22 semi permanently attachable to tire 14 so that when the need arises to provide a tire 14 traction, the user retrieves one or more traction blades 44 from storage, fastens the one or more blades within sleeve(s) 30 using tensive clip 38, which then provides traction to free the vehicle, where then the one or more blades can be removed and returned to storage until needed again.

Figure 5:
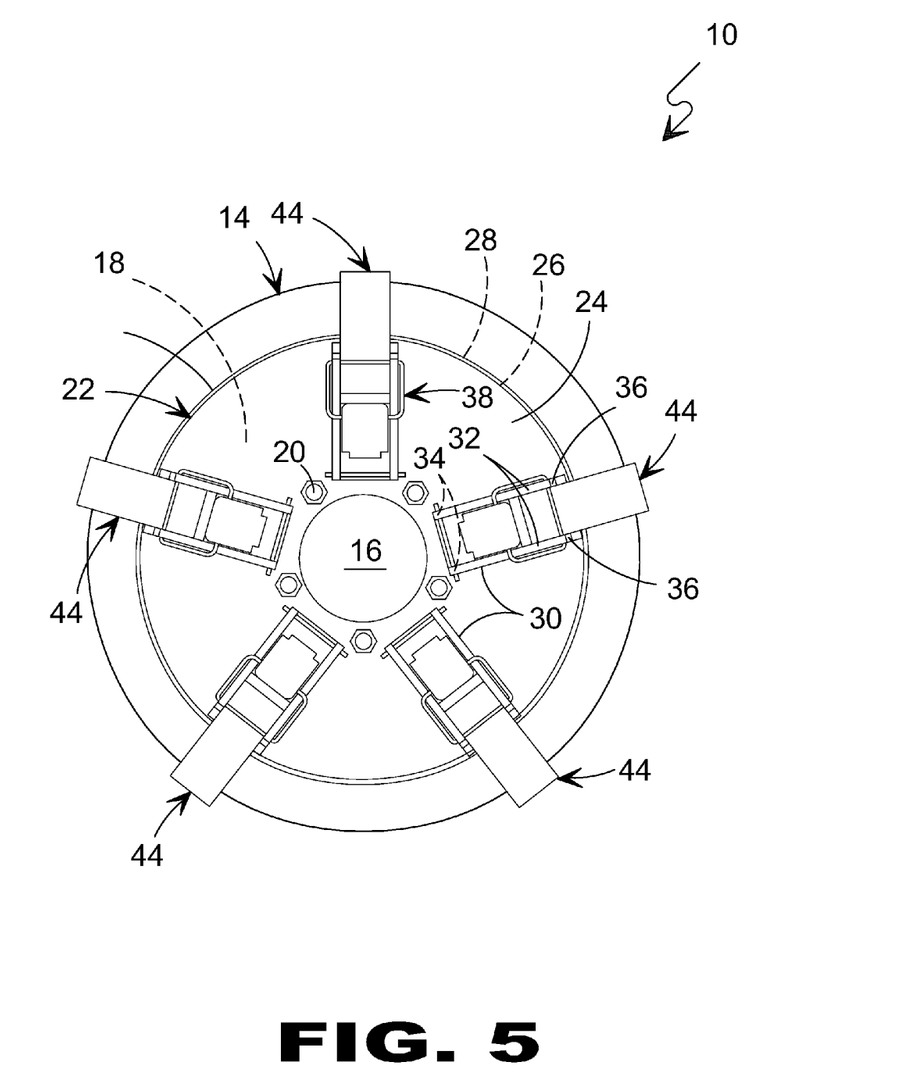
FIG. 5 is a front view of the tire traction device mounted to a tire.

Referring to FIG. 5, shown is a front view of the tire traction device mounted to a tire. Illustrated is tire 14 with traction-blade plate 22 having a centralized bore for receiving wheel hub 16 therein and a plurality of hub bolt apertures receiving hub bolts 20 using typical threaded fasteners thereby releasably attaching the traction-blade plate 22 to tire 14 until selectively removed by the user. Traction plate 22 has a back side 26 and front side 24 with back side 26 optionally providing pad 28 that may be contoured to fit the contour of the hubcap that will add a frictional element to the back of plate 22 and will prevent marring of the hubcap by plate 22. Furthermore, Traction-blade plate 22 can be left on the vehicle 12 for an indefinite length of time, such as all winter. Further provided, are a plurality of traction blade sleeves incorporating walls 32 that have sleeve stud recesses 32 and sleeve latch socket 36 for securely holding traction blade 44 within sleeve 30 using tensive clip fastener 38.

Figure 6:
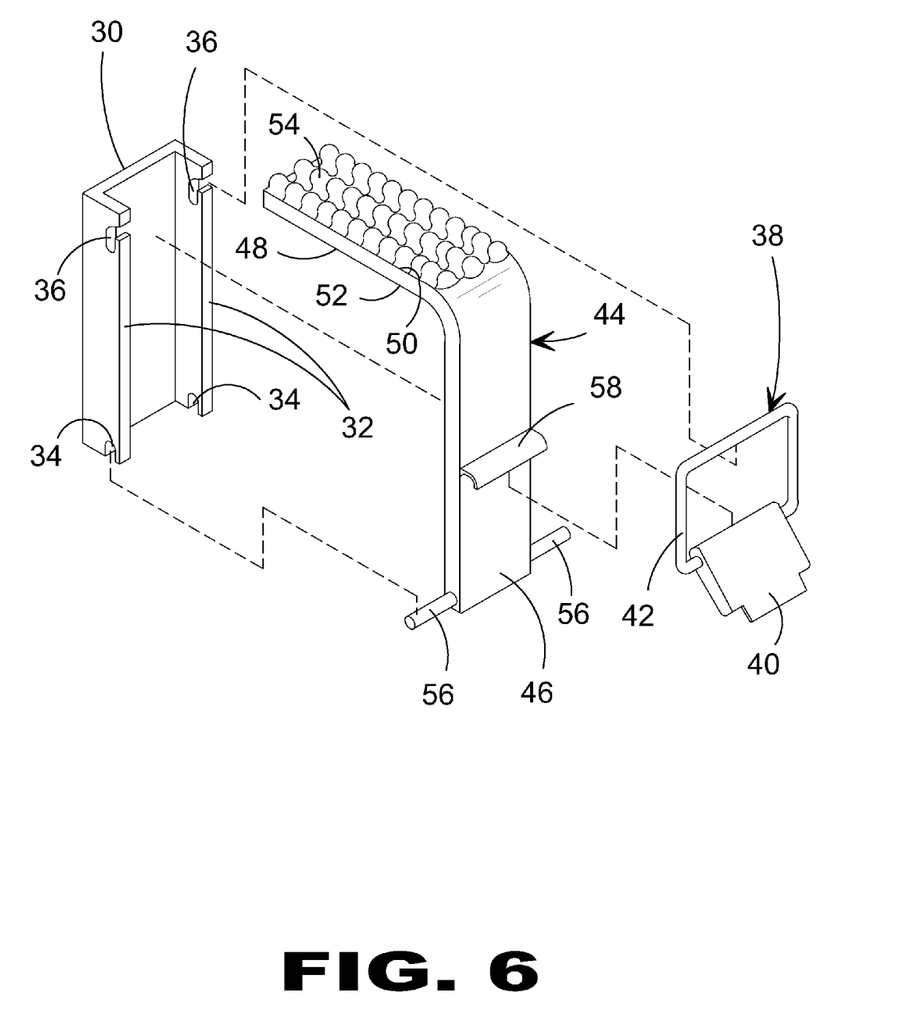
FIG. 6 is an exploded view of a traction-blade plate sleeve, traction blade and tensive clip.
Figure 7:
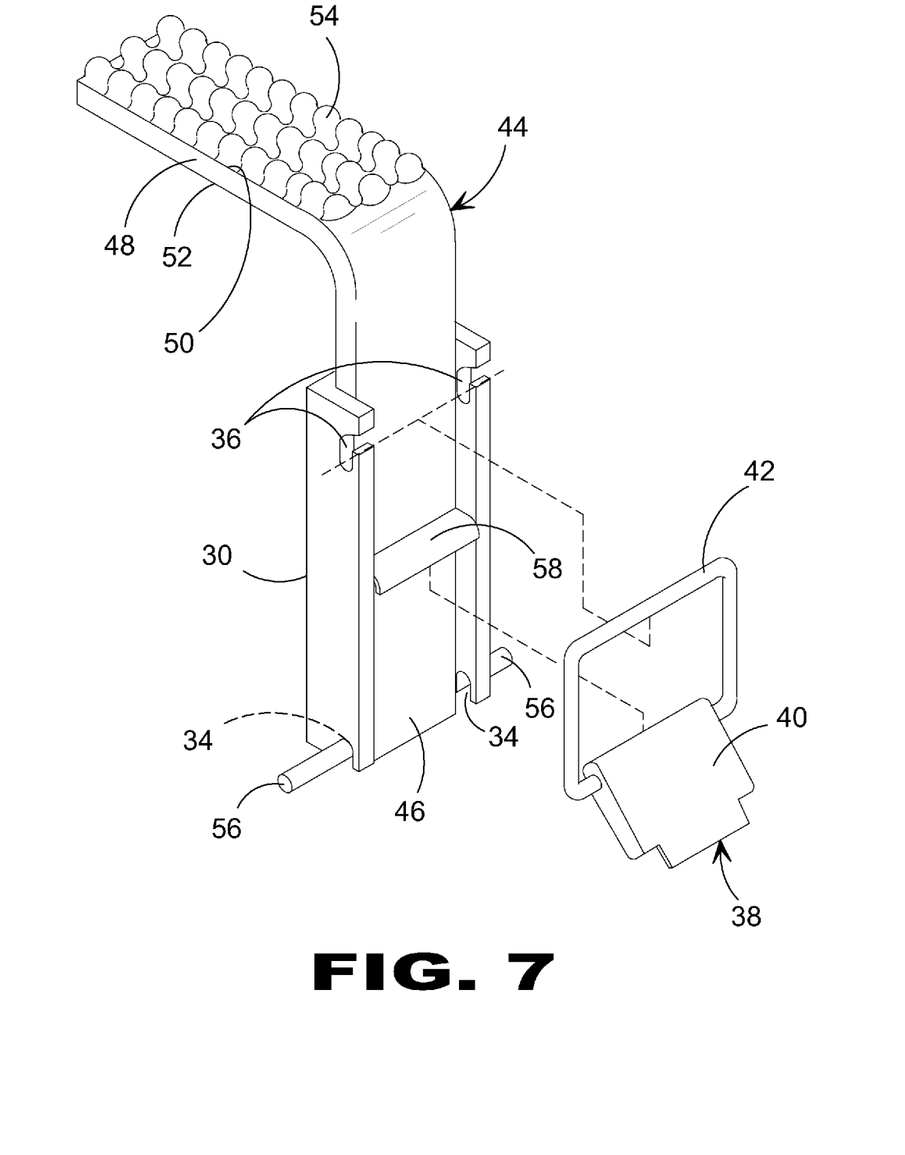
FIG. 7 is a partially assembled view of a traction-blade plate sleeve, traction blade and tensive clip.
Figure 8:
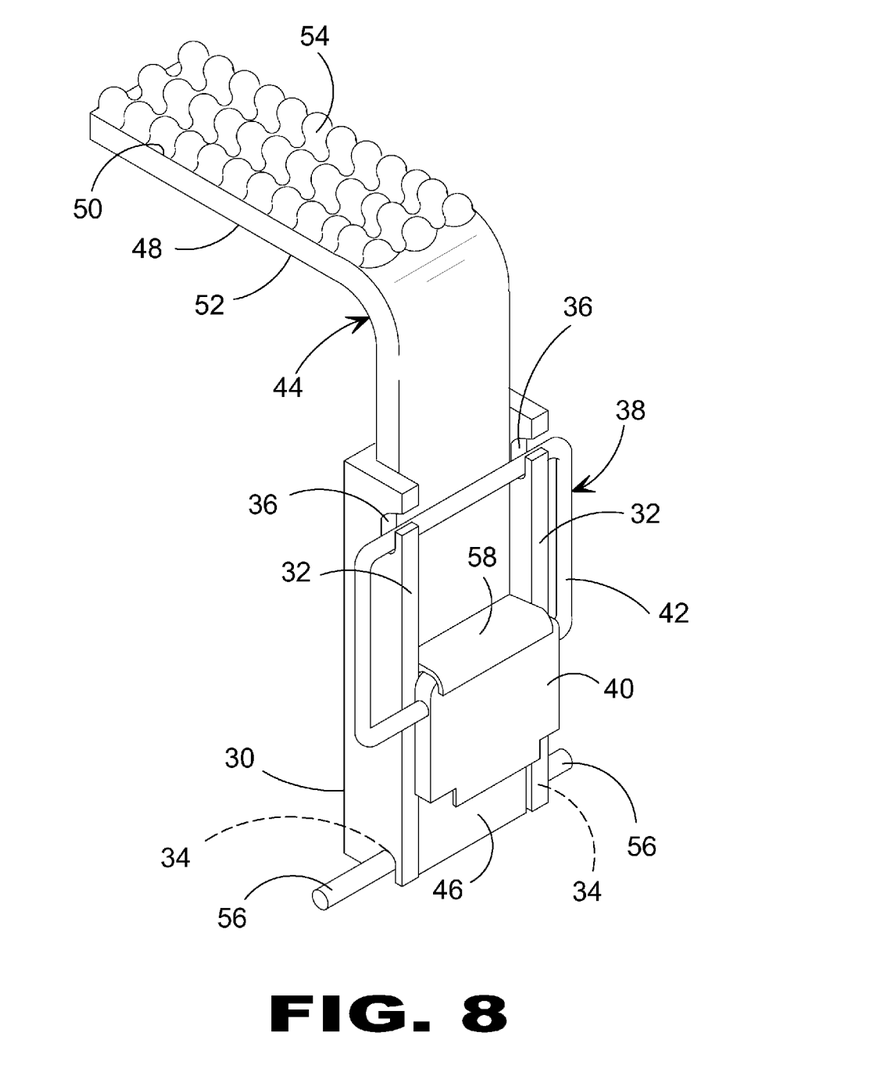
FIG. 8 is an assembled view of a traction-blade plate sleeve having a traction blade releasably attached by tensive clip to the traction-blade plate.

Referring to FIGS. 6 through 8, shown are an exploded view of a plate sleeve, traction blade and tensive clip moving to an assembled view. The sleeve 30 has walls 32 with cavities 34, 36 that form receptacles for a plurality of traction blades 44. To mount a blade within a sleeve, the traction blade 44 has a pair of outwardly depending studs 56 that are seated within sleeve's 30 stud recess 34 (shown in FIG. 7) wherethen tensive clip 38 having handle 40 and pivotally attached latch 32 that is seated within the sleeve's latch socket 36. The traction blade 44 has a handle socket 58 so that when latch 32 is placed in socket 36, (shown in FIG. 8) the tensive clip handle 40 is positioned within the traction blade handle socket 58 with pressure then applied to the front of the handle thereby latching latch 32 pivotally attached to handle 40.

Figure 9:
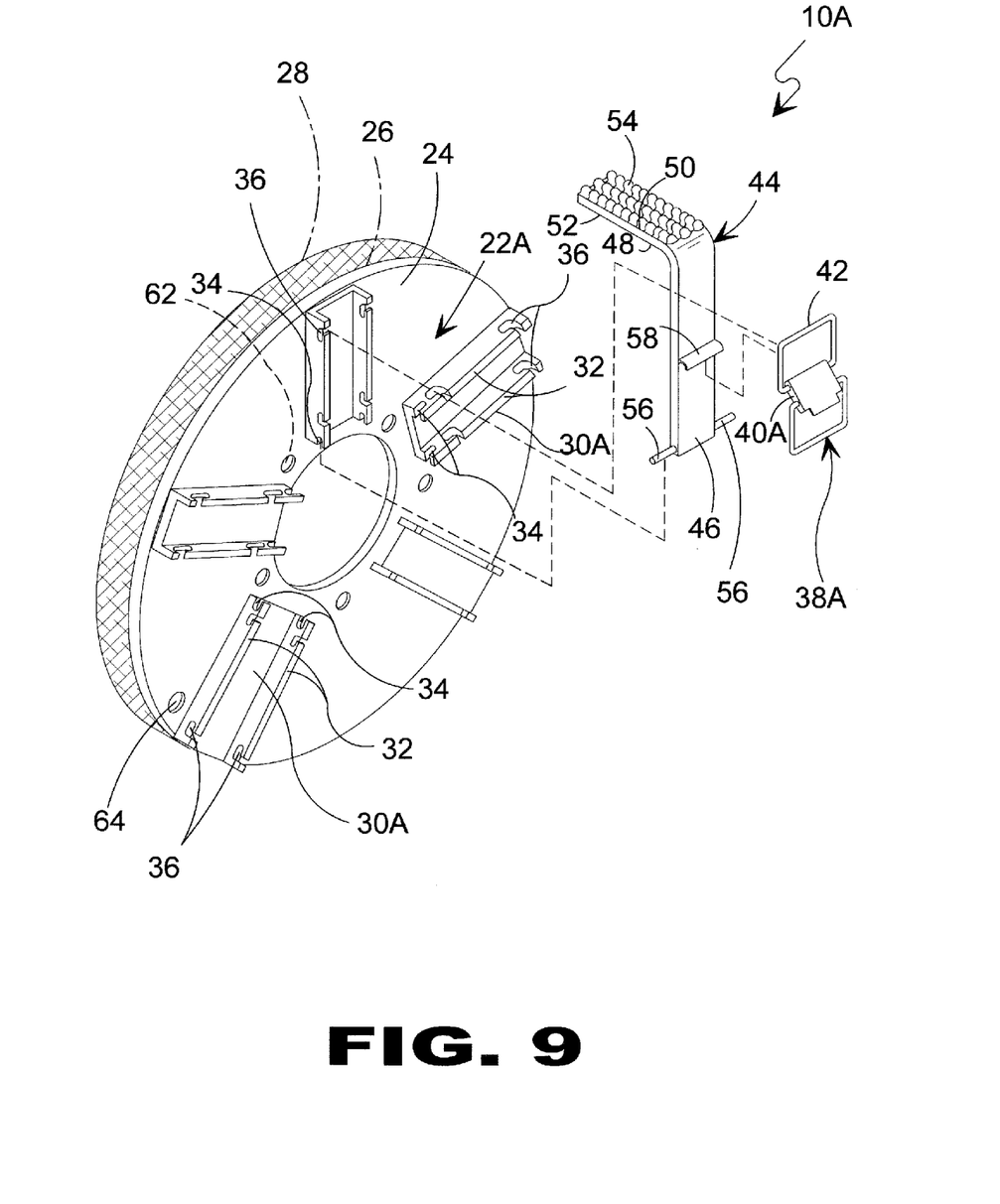
FIG. 9 is an additional element of the present invention providing a second latching member for fixedly attaching a traction blade within a traction-blade sleeve.
Figure 10:
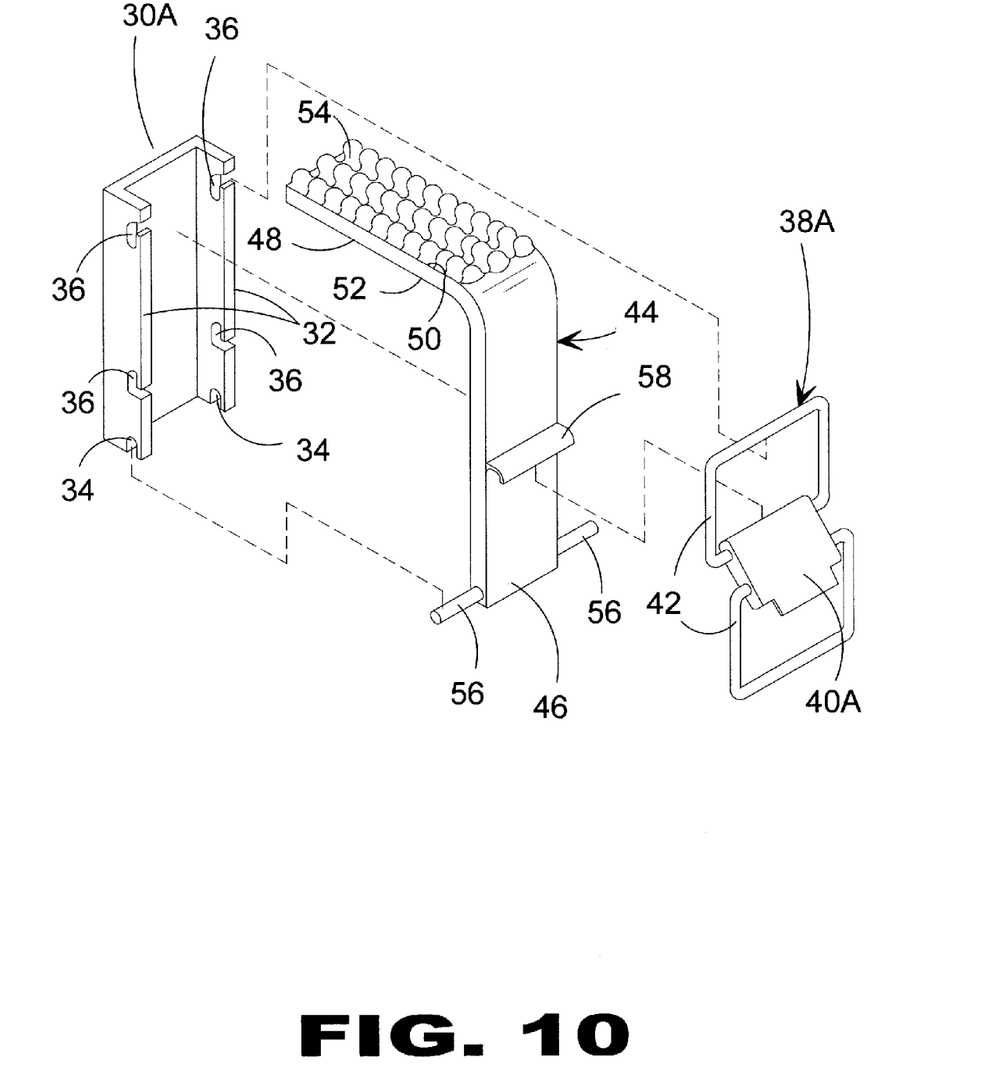
FIG. 10 is an exploded view of the alternate traction-blade plate sleeve, traction blade and alternate tensive clip.
Figure 11:
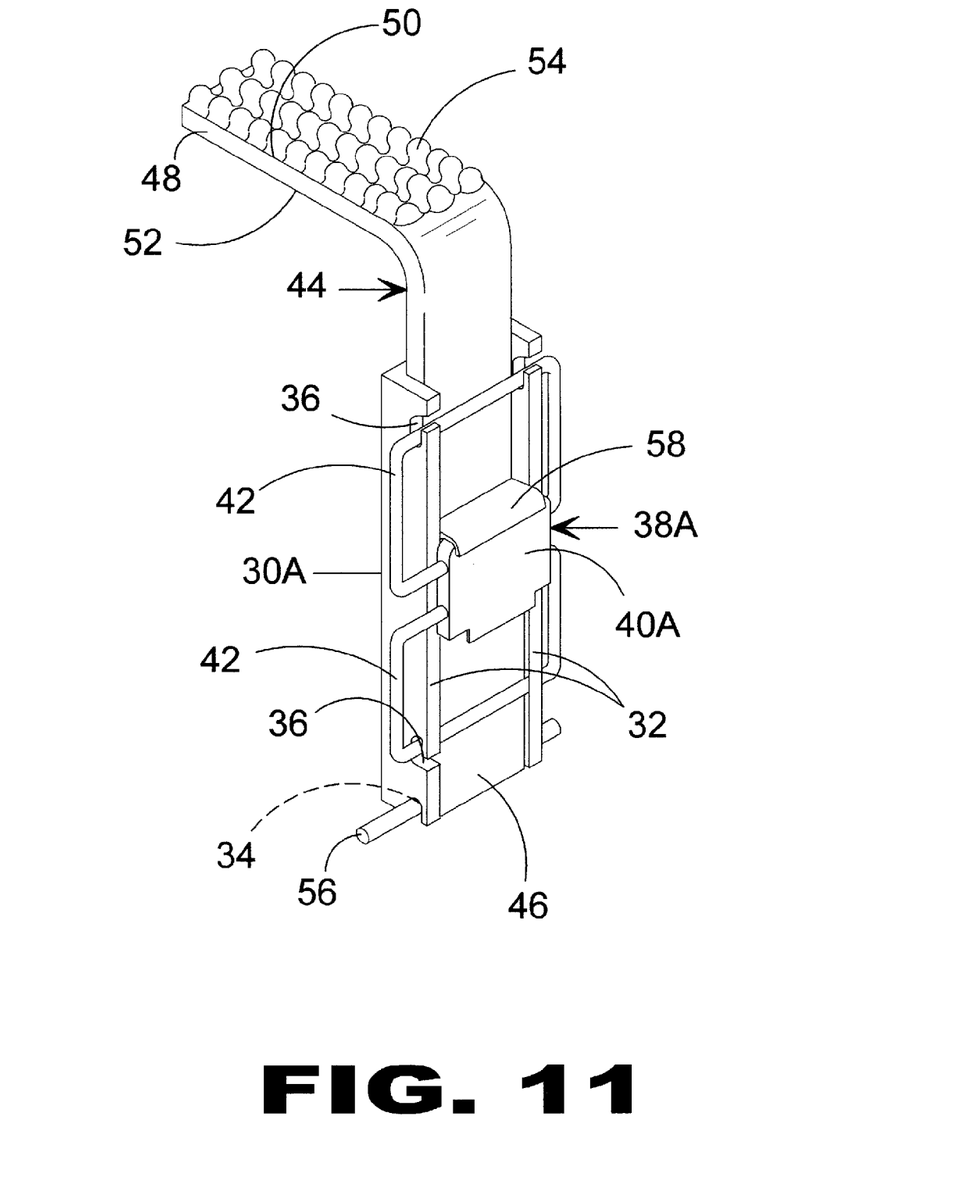
FIG. 11 is an assembled view of the alternate traction-blade plate sleeve having a traction blade releasably attached by the alternate tensive clip to the traction-blade plate.
Figure 12:
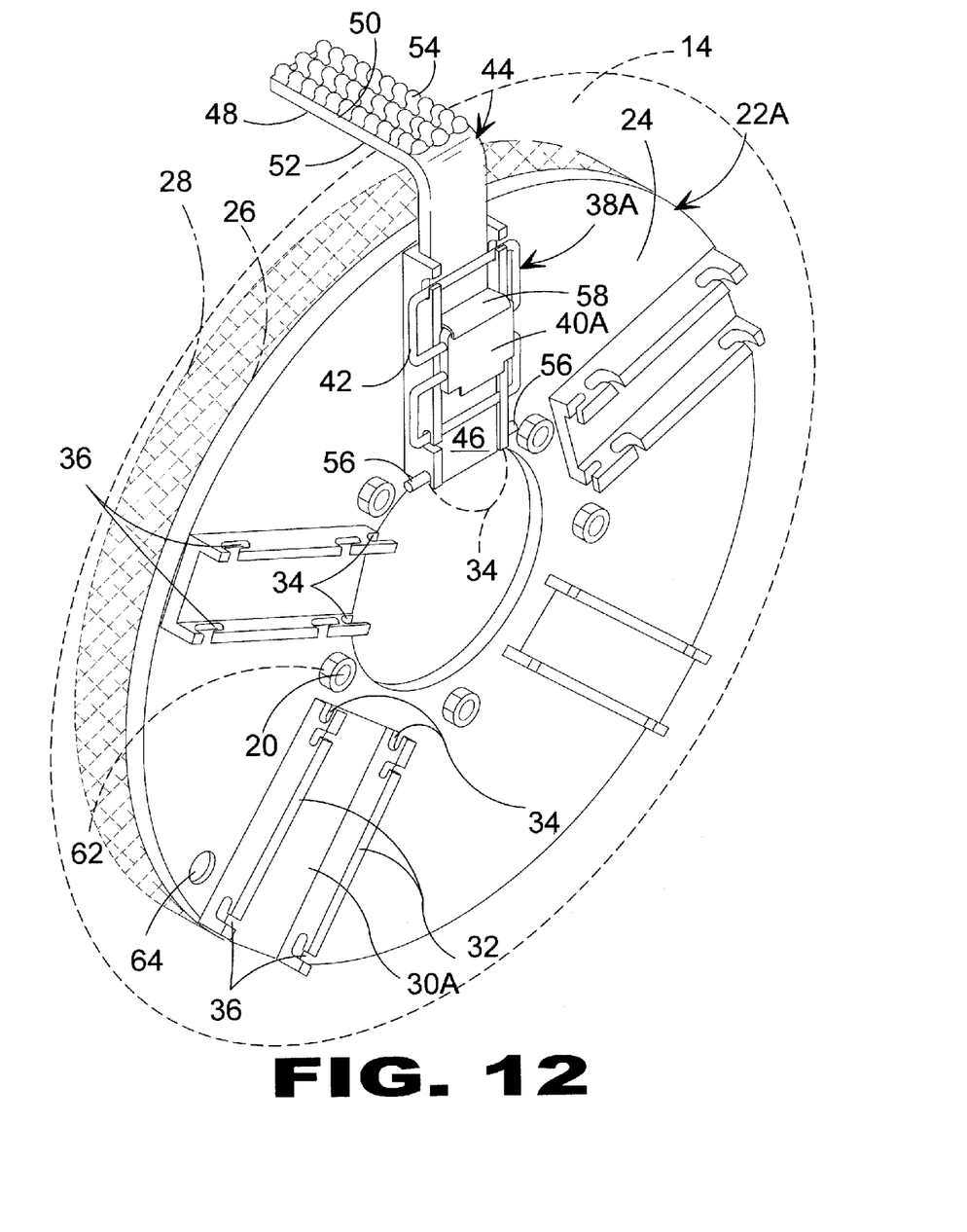
FIG. 12 is an assembled view of a motor vehicle tire having the traction device fastened thereto.

Referring to FIGS. 9 through 12, shown is an additional element of the traction device 10A of the present invention. FIG. 9 depicts traction-blade plate 22A with sleeve 30A having two pair of spaced apart sleeve latch socket 36 with tensive clip fastener 38A having a pair of tensive clip latches 32. FIG. 10 shows a traction plate sleeve 30A having spaced apart walls 32 with a pair of sleeve stud recess 34 and a pair of spaced apart sleeve latch socket 36. The traction blade is positioned within sleeve 30A having traction blade studs 56 positioned within sleeve stud recess 34 then tensive clip 38A having a tensive clip handle 40A with a pair of pivotally attached tensive clip latches 42. Each of the tensive clip latches 42 is placed within a respective sleeve latch socket 36 with the butt of the tensive clip handle 40A positioned within traction blade tensive clip socket 58 where then pressure is applied to the free end of the tensive clip handle 40A causing the tensive clip 38A to hold the traction blade 44 within the sleeve 30A until released. FIG. 11 depicts a traction-blade sleeve 30A having a traction blade 44 held within said sleeve 30A by tensive clip 38A. To release the traction blade 44, handle 40A is pivoted moving handle 40A out of its seated position within traction blade handle socket 58 so that tensive clip latch 42 is removable from sleeve latch socket 36 thereby releasing traction blade 44 from sleeve 30A which can be stored until needed again. FIG. 12 depicts an assembly view of the traction device using a dual latching tensive clip fastener for holding a traction blade within the sleeve.

Figure 13:
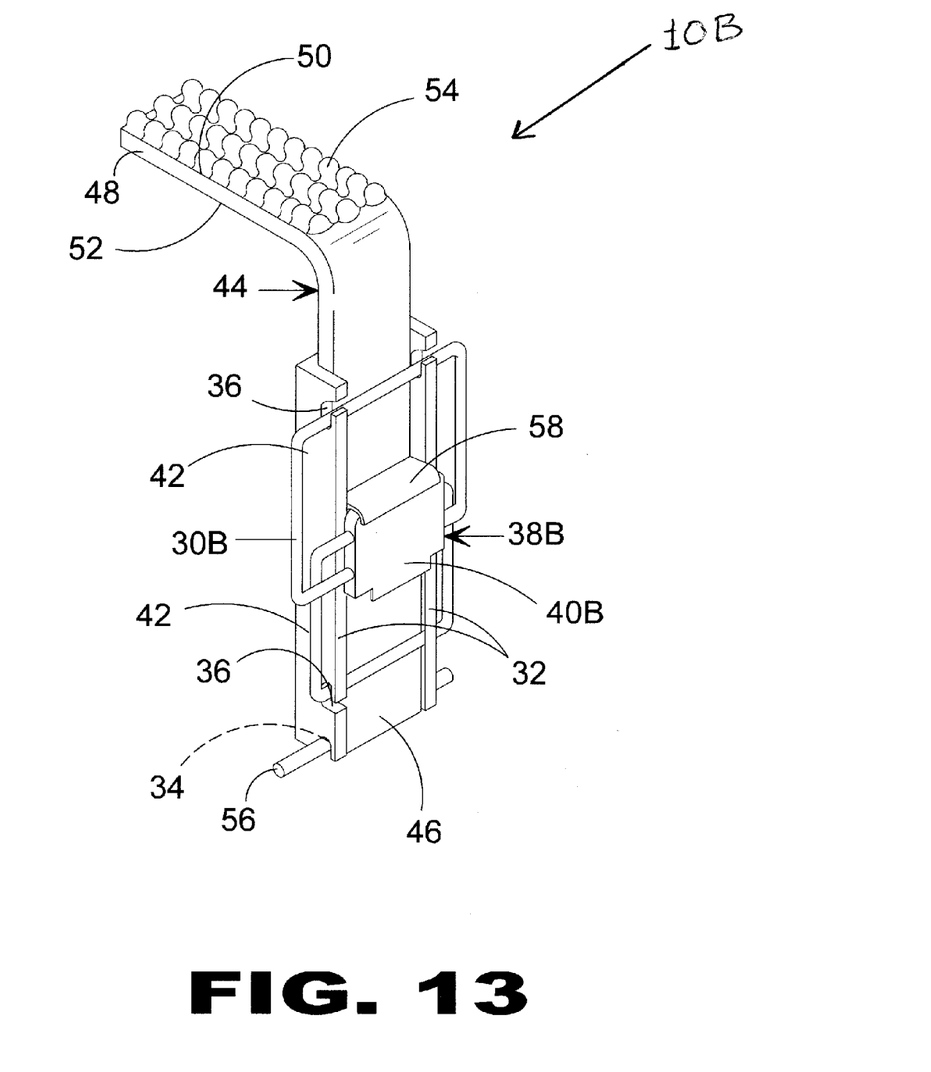
FIG. 13 is an assembled view of another enablement of the tensive clip fastener holding a traction blade within the tensive blade sleeve.

Referring to FIG. 13, shown is an additional element of the traction device 10B of the present invention. Depicted is a traction-blade sleeve 30B having a traction blade 44 held within said sleeve 30B by tensive clip 38B. To release the traction blade 44, handle 40B is pivoted moving handle 40B out of its seated position within traction blade handle socket 58 so that tensive clip latch 42 is removable from sleeve latch socket 36 thereby releasing traction blade 44 from sleeve 30B which can be stored until needed again.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A motor vehicle tire traction device comprising:
    a) a traction-blade plate mountable to a motor vehicle tire having a plurality of radially arrayed sleeves for placement therein each of a traction blade;
    b) each of said plurality of traction blades being mountable within a respective traction-blade plate sleeve, said traction blade comprising a shank portion and a traction portion with the shank portion held within said sleeve, and the traction portion in engagement with and extending across tread of said motor vehicle tire;
    c) a tensive clip fastener latchable to said sleeve for holding the traction blade within said sleeve until selectively removed; and
    d) each said traction blade shank portion having a pair of divergent studs situated near a bottom of each blade with each of the studs positionable within a respective sleeve stud recess.

2. The motor vehicle tire traction device of claim 1, wherein said traction blade shank portion further provides a tensive clip handle socket that receives a handle seat during latching of said traction blade within said respective traction sleeve.

3. The motor vehicle tire traction device of claim 2, wherein said traction blade traction portion has a tire engaging portion and a ground engaging portion wherein said ground engaging portion is provided with a road engaging traction surface.

4. The motor vehicle tire traction device of claim 3, wherein said road engaging traction surface is provided by attaching a frictional element to the surface of said ground engaging portion as a frictional element for said traction blade traction portion.

5. A motor vehicle tire traction device comprising:
    a) a traction-blade plate mountable to a motor vehicle tire having a plurality of radially arrayed sleeves for placement therein each of a traction blade;
    b) each of said plurality of traction blades mountable within a respective traction-blade plate sleeve;
    c) a tensive clip fastener latchable to said sleeve for holding the traction blade within said sleeve until selectively removed; and
    d) said tensive clip fastener comprising a tensive clip latch portion and a tensive clip handle portion with said tensive clip latch portion pivotally mounted to said handle portion.

6. The motor vehicle tire traction device of claim 5, wherein said tensive clip latch portion is mounted within a sleeve latch socket with a pivotal end of the handle portion inserted into a traction blade tensive clip handle socket wherethen force applied to a front of the handle locks the traction blade within the traction blade sleeve.

7. A motor vehicle tire traction device comprising:
    a) a traction-blade plate mountable to a motor vehicle tire having a plurality of radially arrayed sleeves for placement therein each of a traction blade;
    b) each of said plurality of traction blades mountable within a respective traction-blade plate sleeve;
    c) a tensive clip fastener latchable to said sleeve for holding the traction blade within said sleeve until selectively removed;
    d) said tensive clip fastener comprising a pair of tensive clip latch portions and a tensive clip handle portion with said tensive clip latch portions pivotally mounted to said handle portion; and
    e) said traction-blade plate sleeve comprising a base with a pair of opposing walls having traction-blade plate sleeve stud recesses and a pair of traction-blade plate sleeve latch sockets.

8. The motor vehicle tire traction device of claim 7, wherein one of said latch portions is mounted within a respective sleeve latch socket with a pivotal end of a handle inserted into a traction blade tensive clip handle socket wherethen force applied to a front of the handle portion locks the traction blade within the traction blade sleeve.

\* \* \* \* \*